Sept. 12, 1950  S. G. GLICK  2,522,220
COMBUSTION GAS PRODUCING APPARATUS
Filed Feb. 23, 1945
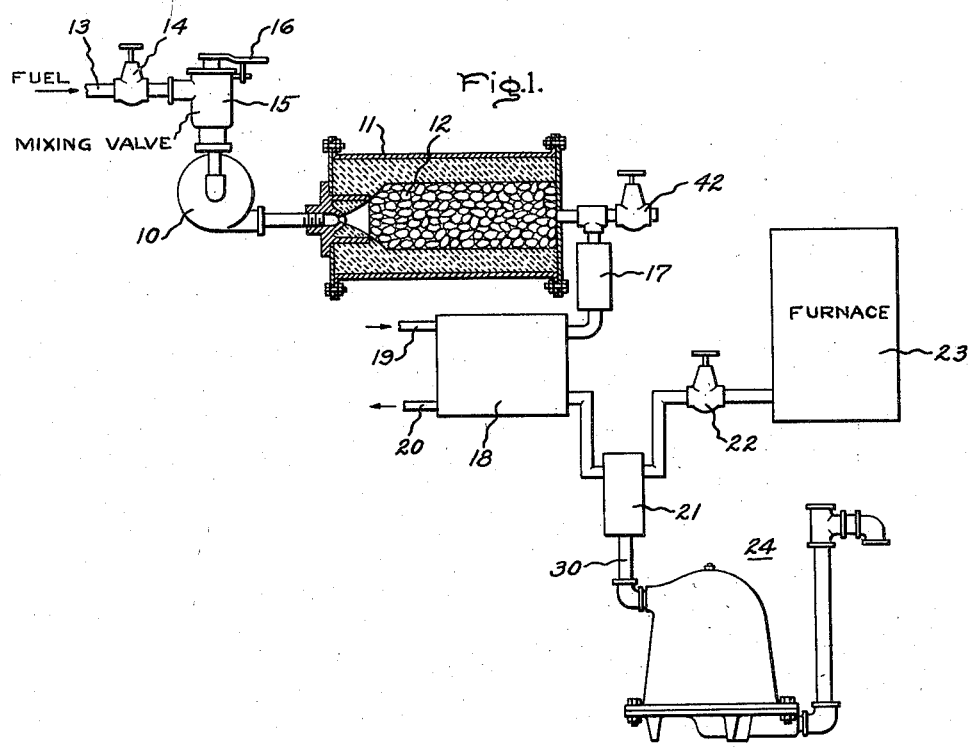
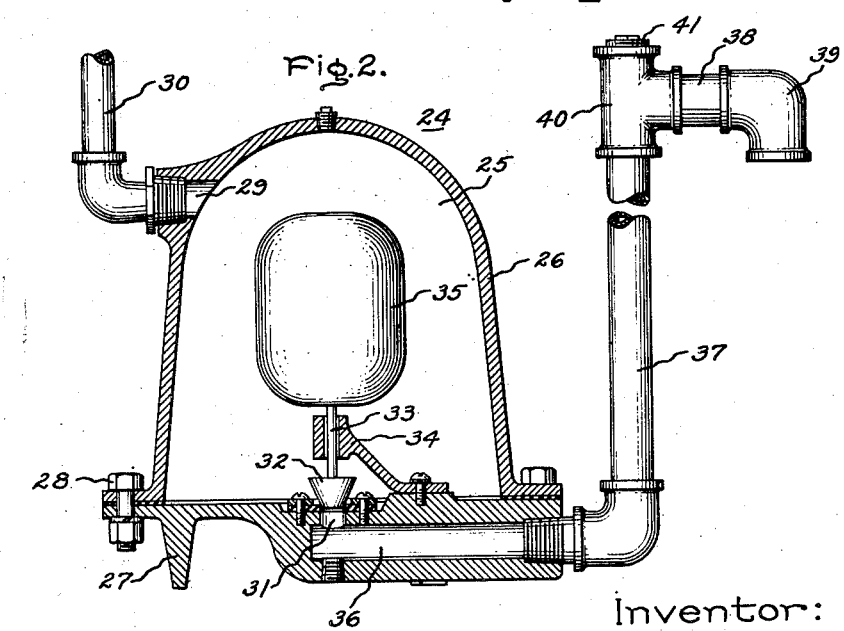
Inventor:
Sylvan G. Glick,
by Harry E. Dunlevy
His Attorney.

Patented Sept. 12, 1950

2,522,220

UNITED STATES PATENT OFFICE 2,522,220

COMBUSTION GAS PRODUCING APPARATUS

Sylvan G. Glick, Schenectady, N. Y., assignor to General Electric Company, a corporation of New York Application February 23, 1945, Serial No. 579,402

1 Claim. (Cl. 23—281)

My invention relates to combustion gas producing apparatus, more particularly to gas producing apparatus of the combustion type such as utilized for supplying a suitable oxidizing, reducing, or neutral gas atmosphere to furnaces for heating metals, and has for its object a combined water trap and water pressure leg for controlling the discharge of water condensed from the gas before its admission to the furnace.

In gas producing apparatus of the combustion type such as used to supply a gaseous atmosphere to furnaces for heat treating metals, a fuel gas and air mixture is supplied under a predetermined pressure, such as two pounds a square inch, to a combustion chamber where the mixture is burned. The products of combustion are then conveyed by suitable conduit means through a gas purifier, a condenser wherein the gas is cooled and part of the moisture condensed out of the gas, a water separator and trap wherein the condensed water is discharged and thence to the furnace. I have found that the conventional valve type water trap has certain disadvantages, such as stoppage from the accumulations of dirt in the valve, leakage of gas through the valve, and sticking of the valve in its closed position when the apparatus has been out of operation for a considerable period of time.

In carrying out my invention, I provide a water head overflow for the discharge of the condensed water wherein a large discharge opening is maintained at all times, and the possibility of leakage is obviated. I also provide a valve which normally is maintained in its open position by the water but which closes to prevent the escape of gas in the event of a greatly increased gas pressure, such as when the supply of gas to the furnace is discontinued temporarily with the gas producer remaining in operation.

For a more complete understanding of my invention, reference should be had to the accompanying drawing, Fig. 1 of which is a diagrammatic representation of combustion gas producing apparatus for a furnace embodying my invention; while Fig. 2 is an enlarged view of the water trap and water leg device of Fig. 1.

Referring to the drawing, I have shown my invention in one form as applied to gas producing apparatus of the combustion type for supplying a gas atmosphere to furnaces of the type disclosed in Patent 2,085,584, issued on June 29, 1937, to Orin S. Haskell. This combustion apparatus comprises a motor driven centrifugal pump 10 for forcing a mixture of fuel and air at a predetermined pressure, such as two pounds a square inch, into a combustion chamber 11 where the mixture is burned in contact with fragments 12 of a catalyst brick nearly filling the chamber. The fuel may, for example, be artificial or natural hydrocarbon gas and it is supplied through a pipe 13 and a shutoff valve 14 to a mixing valve 15 in which a predetermined proportion of air is mixed with the fuel as determined by the position of the handle 16. The mixture passes from the mixing valve 15 to the pump 10, by means of which it is supplied under pressure to the combustion chamber.

From the combustion chamber, the gaseous product resulting from the burning of the gas and air mixture passes first through suitable conduit means to a purifier 17 for removing, if desired, any small quantity of oxygen remaining in the products of combustion. From the purifier, the gas passes through a suitable conduit in a condenser or cooler 18 in which cooling water is passed around the conduit and the gas thereby cooled to a relatively low temperature for the condensation of a desired portion of the moisture in the gas. Cooling water is circulated through the condenser 18 by means of an inlet conduit 19 and an outlet conduit 20. From the condenser, the gas passes through a water separator 21 of a suitable baffle type. From the condenser, the thus purified and cooled gas passes through a shutoff valve 22, and thence to the furnace 23 of a suitable type, such as an electric furnace for heat treating metals.

In accordance with my invention, I provide a combined water trap and water head device 24 for controlling the discharge of the condensed water from the water separator 21. As shown in Fig. 2, this device comprises a chamber 25 formed by a substantially cylindrical hood member 26, the bottom of which is sealed by a support 27 to which the flanged edge of the hood member 26 is secured tightly by suitable bolts 28. At its upper end, the hood member is provided with an aperture 29 which is connected through a conduit 30 with the bottom discharge opening of the water separator 21. In the bottom member 27 is a substantially central discharge opening 31 associated with which is a movable valve member 32 having a stem 33 extending upward through an aperture in a guide member 34 and secured at its upper end to a float 35. At its lower end the wall of the opening 31 connects with a horizontal opening 36 forming a duct in the support 27, the outer end of which duct is connected to an upwardly extending conduit 37. This conduit extends upward for a suitable distance to give a desired head of water and at its upper end it is connected to a horizontal discharge pipe 38 which terminates in a downwardly positioned elbow 39. As shown, the connection between the pipes 37 and 38 is made by means of a T 40 although an elbow may be used. When a T is used, as shown, the upper end of the T is closed by a suitable plug 41.

In the operation of the apparatus, a small quantity of water is first poured into the chamber 25 and the pipe 37 so as to form a water head and raise the valve member 32 to its uppermost position to open completely the opening 31. This water may be poured in conveniently by removing the plug 41 in the T connection. In a typical apparatus, about one gallon of water was required to substantially fill the chamber 25 and the pipe 37.

The gas producer is then started by operating the pump 10 and opening the fuel supply valve 14, after which the valve 42 is momentarily opened and the mixture in the chamber 11 ignited. Then the valve 42 is closed and the burning continues as long as the fuel mixture is supplied by the pump 10. It is assumed that the valve 22 is open and that the gas flows into the chamber of the furnace 23 which is substantially gas tight except for unavoidable small leaks around the door (not shown) for the charging opening of the furnace. At first, the burned gas displaces the air in the conduit connections, which air leaks out of the furnace and then the burned gas reaches the furnace chamber. Thereafter, the furnace chamber is purged of air by the incoming burned gas and the furnace is then ready for operation at the desired high temperature. The furnace may be heated and brought up to temperature partly or wholly before the gas producer is started. The permissible temperature of the furnace before it is filled with the gas depends, of course, upon the oxidizing characteristics of metal parts of the furnace itself and the charge to be heated. In the annealing of steel, the furnace must be completely purged of air before the steel is raised to a temperature at which it will oxidize to an objectionable extent in the presence of air.

The water condensed out of the burned gas passes into the chamber 25 and, when the pipe 37 is filled, overflows and discharges through the pipe 38 and the elbow 39. During these normal operating conditions, the pressure of the burned gas in the separator 21, as well as at the point of admission to the furnace, is relatively low as compared with the pressure maintained by the blower 10. For example, the pressure of the gas when admitted to the furnace may be the equivalent of only two inches of water. The water head provided by the pipe 37 is a suitable wide margin above the gas pressure. In a typical apparatus, the water head provided by the pipe 37 and its connections above the lowermost point of the conduit 36 was approximately fifteen inches. This water head must be high enough to assure that the float 35 and the valve member 32 are maintained in their extreme uppermost positions during normal operating conditions thereby to provide a water leg discharge opening for the maximum freedom of flow of the condensed water and any dirt or deposits in it out through the opening 31 and the conduits of the water leg. In other words, the water head provided by the pipe 37 must be substantially higher than that water head required to lift the float and valve member to their full open positions; in the system described at least two inches higher to balance the normal pressure of the gas in the separator 21. It is important, however, that the overflow water level be no higher than the bottom of the separator 21 to prevent water stoppage of the flow of gas through the separator.

While this water head is ample to take care of any variations in the pressure of the burned gas during normal furnace operating conditions, it is not great enough to balance the full gas pressure of the blower 10 which appears in the event that the valve 22 is closed to shut off the supply of gas to the furnace temporarily while the gas producer apparatus remains in operation. It will be understood that the decreased pressure in the gas producer system, from two pounds a square inch at the blower to only the equivalent of about two inches of water at the furnace, is caused by the gas pressure drop in the combustion chamber and other parts of the apparatus through which the gas is forced by the blower. Therefore, when the valve 22 is shut off, the gas pressure quickly builds up in the end conduit connections and the separator 21 to substantially the full pressure applied by the blower 10. This increased pressure forces the water downward through the pipe 30 and out of the chamber 25 until the lowered water level in the chamber causes the float to move the valve member 32 downward and close the discharge opening 31. Thereafter, under these conditions, the device 24 operates as a simple water trap, the float 35 opening the valve in response to an increased water level in the chamber 25 and reclosing the valve when the water has been forced out to a predetermined lower level.

It will further be observed that when the gas producing apparatus is shut down after normal operation with the normal amount of water in the chamber 25 and the conduits connected thereto, this water remains in the chamber 25 and thereby maintains the valve member 32 in its raised and open position even though the gas producer is shut down for a very considerable period. This obviates the possibility of the valve sticking in its closed position.

While I have shown a particular embodiment of my invention, it will be understood, of course, that I do not wish to be limited thereto since many modifications may be made, and I therefore contemplate by the appended claim to cover any such modifications as fall within the true spirit and scope of my invention.

What I claim as new and desire to secure by Letters Patent of the United States, is:

Apparatus for producing a moisture containing gas for use as a protective atmosphere in furnaces comprising, means for mixing air and a hydrocarbon gas in predetermined proportions, means for maintaining said gaseous mixture under a predetermined pressure, heat refractory walls forming a combustion chamber, conduit means for supplying said mixture to said combustion chamber thereby to produce a burned moisture containing gas, a cooling device for said combusted gas, conduit means for passing said gas under pressure from said combustion chamber through said cooling device whereby a portion of the moisture in said gas is condensed out, a combined water trap and water head device positioned below said cooling device and comprising walls forming a chamber connected to said cooling device to receive water condensed from said gas, a lower wall of said chamber being provided with a water drain orifice, a valve member movable within said chamber to open and close said orifice, a float in said chamber connected to said valve member for the operation thereof, said float operating said valve member to open said orifice when the float rises and to close said orifice when it falls, and a combined drain and water leg conduit connected to the outlet of said orifice and extending externally of said chamber upward to a point higher than said flat and lower than said cooling device and forming an overflow discharge opening at said point, the height of the water level of said overflow discharge opening being at least equal to the sum of the height of water head required to cause said float to maintain said valve member in the open position plus an additional height of water head equivalent to the normal pressure of the combusted gas in said apparatus, whereby said orifice normally remains open and water flows freely therethrough and through said drain and water leg conduit and is discharged through said overflow discharge opening, but an increase in combusted gas pressure in said apparatus above a predetermined value reduces the water level in said chamber sufficiently that said float causes said valve member to close said orifice and prevents the escape of gas through said drain and water leg conduit.

SYLVAN G. GLICK.

REFERENCES CITED

The following references are of record in the file of this patent:

UNITED STATES PATENTS

| Number | Name | Date |
| --- | --- | --- |
| 811,420 | Marsh | Jan. 30, 1906 |
| 874,112 | Peck | Dec. 17, 1907 |
| 2,085,584 | Haskell | June 29, 1937 |
| 2,085,586 | Hotchkiss | June 29, 1937 |

FOREIGN PATENTS

| Number | Country | Date |
| --- | --- | --- |
| 516,453 | France | Dec. 6, 1920 |
| 437,244 | Germany | Nov. 18, 1926 |

OTHER REFERENCES

Chemical Eng. Catalog, 27th edition, 1942-3, pages 747 and 1094.